Sept. 19, 1950 W. D. KNOX 2,522,951
TRACTOR HITCH COUPLER
Filed Dec. 6, 1948
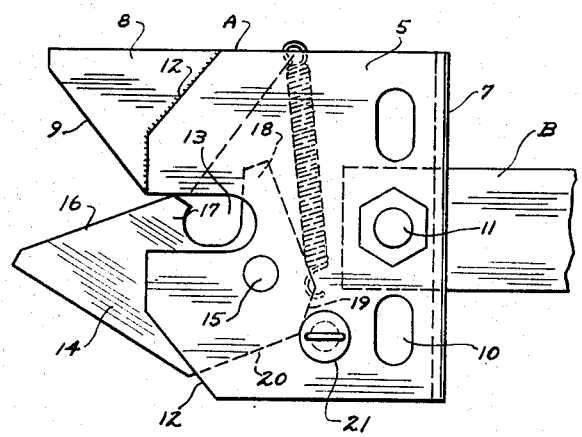
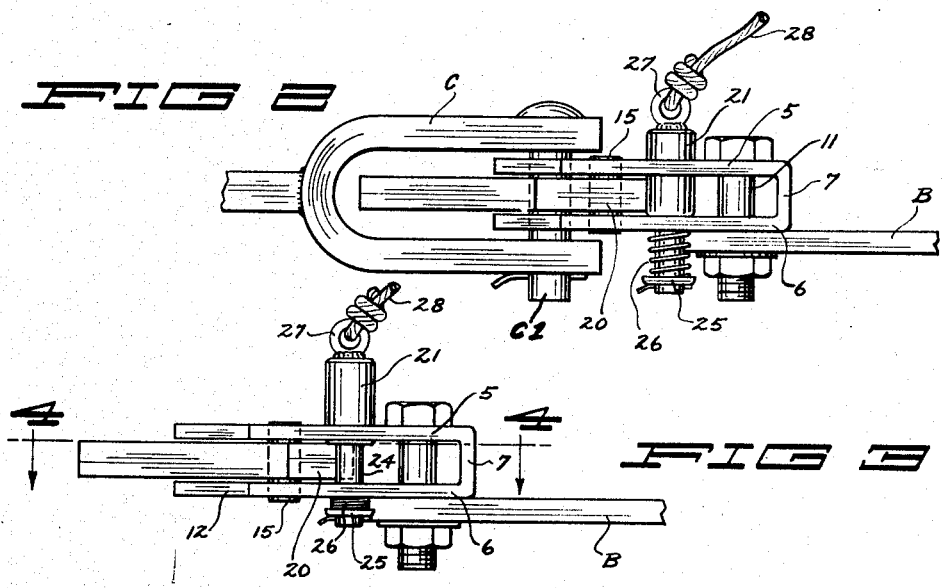
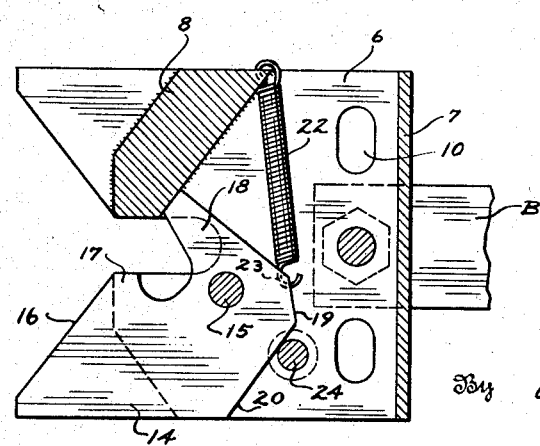
Inventor
WILLARD D. KNOX Patented Sept. 19, 1950

2,522,951

UNITED STATES PATENT OFFICE 2,522,951

TRACTOR HITCH COUPLER

Willard D. Knox, Tracy, Minn., assignor of one-third to Jerry J. Ravers, Jr., Amiret, and one-third to Harry K. Nyberg, Tracy, Minn.

Application December 6, 1948, Serial No. 63,801

2 Claims. (Cl. 280—33.15)

My invention relates to improvements in couplings and more particularly to the type mounted on tractors for making a draft connection between the tractor and an implement to be towed.

The primary object of my invention is to provide a tractor coupling which allows an implement to be easily coupled to or uncoupled from the tractor without the necessity of the operator leaving the tractor seat or assuming a dangerous position. That is, I here provide a device which may be operated from a remote point to avoid injuries which often result from accidents in the coupling or uncoupling operations.

Another object is to provide a device of this nature which is simple, efficient, and durable, and which may be readily manufactured at a low cost.

These and other more detailed and specific objects will be disclosed in the course of the following specification, reference being had to the accompanying drawing, in which:

Fig. 1 is a top or plan view of the coupling mounted on a tractor draw bar, and in a closed or locked position.

Fig. 2 is a side elevation of the coupling in its closed position, and showing the device as connected to the hitch member of a drawn implement.

Fig. 3 is a side view of the device in its open position, and with the implement hitch removed.

Fig. 4 is a sectional plan view on line 4—4 of Fig. 3.

Referring more particularly to the drawing and by reference characters, the letter A designates generally my improved tractor coupling mounted on a tractor drawbar B and adapted to engage and secure the vertical hitch pin C1 of a hitch bar C extending from the towed implement (not shown). The coupling A is composed of upper and lower plates 5 and 6, respectively, held spaced apart by an integrally formed front end wall 7 and a block 8 disposed and welded in between the opposite rear portions of the plates at one side, and extending rearwardly therefrom. The block 8 is tapered so as to have an open diagonal edge face 9. The plates 5 and 6 are provided with apertures 10 to receive means such as bolt 11 for securing the coupling to the tractor drawbar B. Plates 5 and 6 are flat and formed as shown of a generally square design with rear corners cut off as at 12 and having rearwardly opening and vertically aligned notches to form a throat 13 for receiving a hitch element such as pin C2 of hitch C.

A latch member or locking plate 14 is pivotally supported between plates 5 and 6 on a pin 15 for lateral closing and opening movements over throat 13, as best shown in Fig. 2. This latch member is flat and is designed substantially as shown with its rear portion pointed in the same manner as block 8 so that its inner edge face 16 and face 9 form a rearward flaring open mouth for throat 13 when the latch is in its open position (Fig. 4). Forward of its diagonal edge face 16 the latch 14 is provided with a hook portion 17, a projection 18, and angular edge faces 19 and 20, as shown. The frontal faces 19 and 20 cooperate with a latch pin 21 in a manner to be presently described. A spiral spring 22 extends between and connects the front outside corner of block 8 with the latch member at a convenient point forward of pivot pin 15, as at 23.

The pin 21 has a reduced end portion 24 and is slidably mounted for up and down movement in vertically aligned apertures in plates 5 and 6. The aperture in plate 6 is large enough only to receive the end portion 24 and the pin is secured against upward removal therefrom by a washer and cotter pin assembly 25. An expansion spring 26 is disposed around the end portion 24 and between the plate 6 and washer 25 so as to urge pin 21 downwardly. A means for lifting the pin against spring 26 is provided by ring 27 at the top of the pin and a chain wire or rope 28 attached thereto and extending to the operator's platform.

An important element of my invention is the position of pin 21 in relation to the edge faces 19 and 20 of the latch member 14. As shown by Figs. 3 and 4, when the coupling is open the pin is releasably held in its raised position by the frontal portion of the latch member engaging under the shoulder formed by the enlarged upper end of the pin and with face 20 near or against the reduced end portion 24 of the pin. When the hitch pin C1 is then caused to enter the throat 13 of the coupling it moves against the projection 18 pivoting the latch member about pivot pin 15 against the resistance of spring 22. When this movement has continued to the point shown in Fig. 1 the face 19 has been brought to a position adjacent the pin 21, but since this face 19 is closer than face 20 to the pivot, it provides clearance that will allow the spring 26 to pull the pin downwardly to the position shown in Fig. 2. Face 19 then abuts against the larger part of pin 21 and prohibits return movement of the latch member. The hook portion 17 is now securely locked over throat 13 and acts as a shackle to the hitch pin C1 in the closure thereby formed.

To release the hitch member C a pull is exerted on the rope 28 thus raising the pin and allowing the latch member to return to its open position by combined action of spring 22 and the movement of the hitch pin out of throat 13 as the tractor is driven forwardly.

It will be noted that the closing movement of the latch member is limited by the hook portion 17 contacting the inside edge of block 8. Similarly the opening movement is terminated when projection 18 contacts the adjacent forward edge of block 8.

It may be also noted that the pull exerted on the latch member is transferred to pressure of face 19 on the latch pin 21. This is an added safety measure making accidental release of the towed implement virtually impossible when the tractor is moving, even though rope 28 be disturbed accidentally. Thus, when there is continuous tension between the tractor and implement, as when plowing, the frictional contact of the latch on the pin makes it necessary to give the pull-cord a substantial pull before the pin can be lifted to release the hitch.

Thus, I here provide a simple yet durable coupling device which may be operated directly from the tractor seat eliminating the danger of accidents which so commonly occur in hitching tractor drawn farm implements to tractors.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hitch coupling comprising a body member having spaced plate portions provided with complemental hitch pin receiving notches, a latch plate pivotally mounted between the plate portions and adapted when turned in one direction to close the notches and thereby secure the hitch pin therein, a locking pin slidably secured in the plate portions in a position laterally adjacent the latch plate to lock the same in its notch closing position, said latch pin having a reduced shank portion slidably retained in one of said plate portions but movable into the space between the plate portions to allow unlocking of the latch plate without removing the latch pin from either plate portion.

2. A hitch coupling comprising a body member having spaced plate portions provided with complemental receiving notches, for receiving a hitch element, a latch member pivotally mounted between the plate portions for movement from an open position to a closed position over the notches, spring means for yieldably holding the latch member in its open position, and locking means for securing the latch member in closed position against the tension of the spring means, said locking means comprising a latch pin slidably extending through the plate portions laterally adjacent the latch member to lock the latch member in its closed position, said pin having a reduced end portion extending through one plate portion and being prevented from removal therefrom by retaining means at the reduced terminal of the pin, a spring disposed between said means and said one plate portion to yieldably retain the main portion of the pin between the plates in its locking position, and means for sliding the pin against tension of the spring to move the reduced portion of the pin into position between the plates to release the latch member for movement to its open position.

WILLARD D. KNOX.

REFERENCES CITED

The following references are of record in the file of this patent:

UNITED STATES PATENTS

| Number | Name | Date |
| --- | --- | --- |
| 795,966 | George | Aug. 1, 1905 |
| 856,795 | Morris | June 11, 1907 |
| 1,879,052 | Bounds | Sept. 27, 1932 |
| 2,269,806 | Brecka | Jan. 13, 1942 |